No. 639,985. Patented Dec. 26, 1899.
S. D. HORTON.
THILL HOOK FOR HOLDBACK STRAPS.
(Application filed Apr. 3, 1899.)
(No Model.)
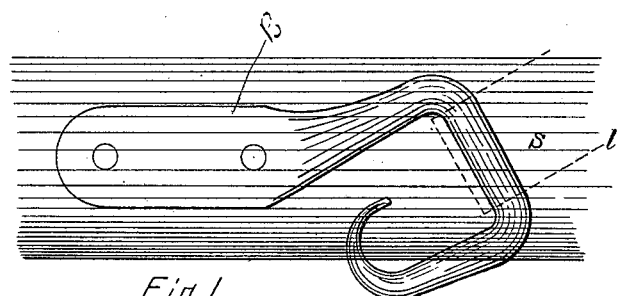
Fig. I
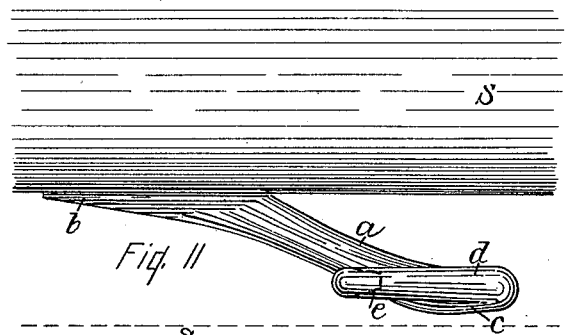
Fig. II
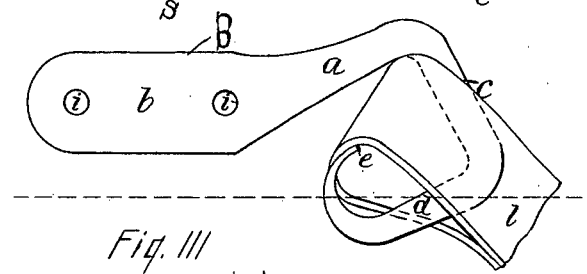
Fig. III
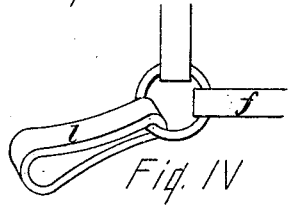
Fig. IV
WITNESSES
Douglas de F. Anderson.
J. R. Manser Jr.
INVENTOR
Stephen D. Horton
BY
H. Manser
ATTORNEY
THE NORRIS PETERS CO., PHOTO-LITHO., WASHINGTON, D. C.

UNITED STATES PATENT OFFICE.

STEPHEN D. HORTON, OF PEEKSKILL, NEW YORK.

THILL-HOOK FOR HOLDBACK-STRAPS.

SPECIFICATION forming part of Letters Patent No. 639,985, dated December 26, 1899.

Application filed April 3, 1899. Serial No. 711,624. (No model.)

*To all whom it may concern:*

Be it known that I, STEPHEN D. HORTON, a citizen of the United States, and a resident of Peekskill, in the county of Westchester and State of New York, have invented certain new and useful Improvements in Thill-Hooks for Holdback-Straps, of which the following is a specification.

My invention relates to fixtures on shafts or thills to which parts of harness are secured, and has for its object a metallic hook for the attachment of the holdback-straps, which extend from the breeching. The object is attained by the means set forth in the following specification and the accompanying drawings.

Thills are usually provided with leather or metallic loops on the under side, about midway of their length, and in fastening the holdback-straps they are passed through the loop and wrapped one or more times around the thills, the free ends of the straps being finally secured within a buckle. To persons not familiar with a particular harness there is always an element of uncertainty about the number of times the strap needs to be wound around the thill, and to avoid this uncertainty and provide a means for at once quickly attaching the strap I have devised the hook set forth in the drawings, in which—

Figure I is a view of my device in which the observer is supposed to be looking down through the thill at the hook secured to its under side. Fig. II is a side view of a section of a thill with the hook attached, the view being from outside the thills. Fig. III illustrates the method of manipulation of the holdback-strap. Fig. IV shows a loop substituted for the usual buckling holdback-strap.

In the first three figures the ends of the thills are supposed to be at the left hand.

In Fig. I the upper side of the illustration is supposed to be the side of the thill next the horse. Broken lines $l$ represent the holdback-strap. If in place of the holdback-strap being a long strap to buckle it be made into the form of a loop, as at $l$, Fig. IV, where it is shown attached to the ring that holds the breeching $f$, then when it is in use it will be in a taut position, as at $l$, Fig. I. The limb $c$ of the hook B, Fig. III, is formed at an angle to the breeching, so as to cause the strap to lie in the position shown in Fig. I, which is the position to bring a direct pull on the entire width of the leather loop $l$.

The only way by which the loop $l$ may be disengaged from the hook B is by slacking the loop $l$, which can be done on either side of the horse by pulling upon it and passing the loop from behind the point $e$ of the hook B, as shown in Fig. III. When in use, as in Fig. I, no slackness of the loop by reason of the attitude or position of the horse can cause a separation of the loop and hook.

The hook is rectangular in form, and the space between the arms $a$ and $d$ of the hook, Fig. III, just easily admits the leather loop sidewise, and no amount of slackness will allow of the separation of the hook and loop, because of the point $e$ projecting centrally back of the loop $l$. The space between the point $e$ and the arm $c$ of the hook just admits of the passage of the leather loop in the position shown in Fig. III. As when united and in use this position cannot be reached without extraneous help, this combination affords a sure and convenient fastening.

To afford ample room for the natural play of the loop $l$ and for its manipulation, the hook depends from its base $b$, as shown in Fig. II.

By means of its base $b$ the hook is secured to the thill by means of rivets $i\,i$ or with screws, as may be preferred.

What I claim, and desire to secure by Letters Patent of the United States, is—

A thill-hook for holdback-straps consisting of a plate extended into a hook of angular form, the free end of the hook curved within and centrally of the space formed by the said angular shape, the hook slightly depending below the thill, substantially as herein shown and described.

Signed at Peekskill, in the county of Westchester and State of New York, this 16th day of January, A. D. 1899.

STEPHEN D. HORTON.

Witnesses:
H. ALBAN ANDERSON,
W. C. VARIN.